(12) United States Patent  (10) Patent No.: US 9,148,355 B2
Tanaka et al.  (45) Date of Patent: Sep. 29, 2015

(54) SYSTEM MANAGEMENT DEVICE, NETWORK SYSTEM, SYSTEM MANAGEMENT METHOD, AND PROGRAM

(71) Applicants: KABUSHIKI KAISHA TOSHIBA, Minato-ku, Tokyo (JP); TOSHIBA SOLUTIONS CORPORATION, Minato-ku, Tokyo (JP)

(72) Inventors: Tomonari Tanaka, Kanagawa (JP); Masamichi Tateoka, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 375 days.

(21) Appl. No.: 13/846,062

(22) Filed: Mar. 18, 2013

(65) Prior Publication Data

US 2014/0089497 A1  Mar. 27, 2014

Related U.S. Application Data

(63) Continuation of application No. PCT/JP2012/074271, filed on Sep. 21, 2012.

(51) Int. Cl.
*G06F 15/173* (2006.01)
*H04L 12/26* (2006.01)

(52) U.S. Cl.
CPC ..................... *H04L 43/08* (2013.01)

(58) Field of Classification Search
USPC ......... 709/203, 217, 223, 224, 226, 228, 229, 709/231, 238; 718/1; 370/389
See application file for complete search history.

(56) References Cited

U.S. PATENT DOCUMENTS 7,454,457 B1 * 11/2008 Lowery et al. ................ 709/224
8,099,457 B2 * 1/2012 Lowery et al. ................ 709/223
(Continued)

FOREIGN PATENT DOCUMENTS

JP  2000-268004  9/2000
JP  2005-115653  4/2005
(Continued)

OTHER PUBLICATIONS

Japanese Office Action for Japanese Patent Application No. 2012-543392 mailed on Jun. 4, 2013.
(Continued)

*Primary Examiner* — Quang N Nguyen
(74) *Attorney, Agent, or Firm* — Amin, Turocy & Watson, LLP

(57) ABSTRACT

A first calculator calculates, for each combination of the physical machines, a network distance representing magnitude of load during communication between one of a plurality of physical machines and another physical machine. An acquisition unit acquires communication permission information representing that a newly operated virtual machine is permitted to communicate with which virtual machine among a plurality of virtual machine already operated in any one of the plurality of physical machines. A second calculator calculates, for each of the plurality of physical machines, a network cost representing magnitude of load of the network system during communication between the communication-permitted virtual machine and a new virtual machine, when one of the plurality of physical machines operates the new virtual machine on the basis of the network distance and the communication permission information. A determination unit determines which physical machine is to operate the new virtual machine, using the calculated network cost.

7 Claims, 10 Drawing Sheets

(56) References Cited

U.S. PATENT DOCUMENTS

| | | | | |
|---|---|---|---|---|
| 8,130,756 | B2* | 3/2012 | Jorgensen et al. | 370/389 |
| 8,296,451 | B2* | 10/2012 | Lowery et al. | 709/229 |
| 8,392,608 | B1* | 3/2013 | Miller et al. | 709/238 |
| 2009/0133018 | A1* | 5/2009 | Kaneki | 718/1 |
| 2014/0215076 | A1* | 7/2014 | Grothues | 709/226 |

FOREIGN PATENT DOCUMENTS

| | | |
|---|---|---|
| JP | 2007-272263 | 10/2007 |
| JP | 2010-146420 | 7/2011 |
| JP | 2011-141635 | 7/2011 |
| JP | 2011-180889 | 9/2011 |
| JP | 2011-186809 | 9/2011 |
| JP | 2011-186821 | 9/2011 |
| JP | 2011-221581 | 11/2011 |
| JP | 2012-48629 | 3/2012 |
| JP | 2012-099062 | 5/2012 |

OTHER PUBLICATIONS

International Search Report for PCT/JP2012/074271 mailed on Nov. 6, 2012.

Written Opinion for PCT/JP2012/074271 mailed on Nov. 6, 2012.

* cited by examiner

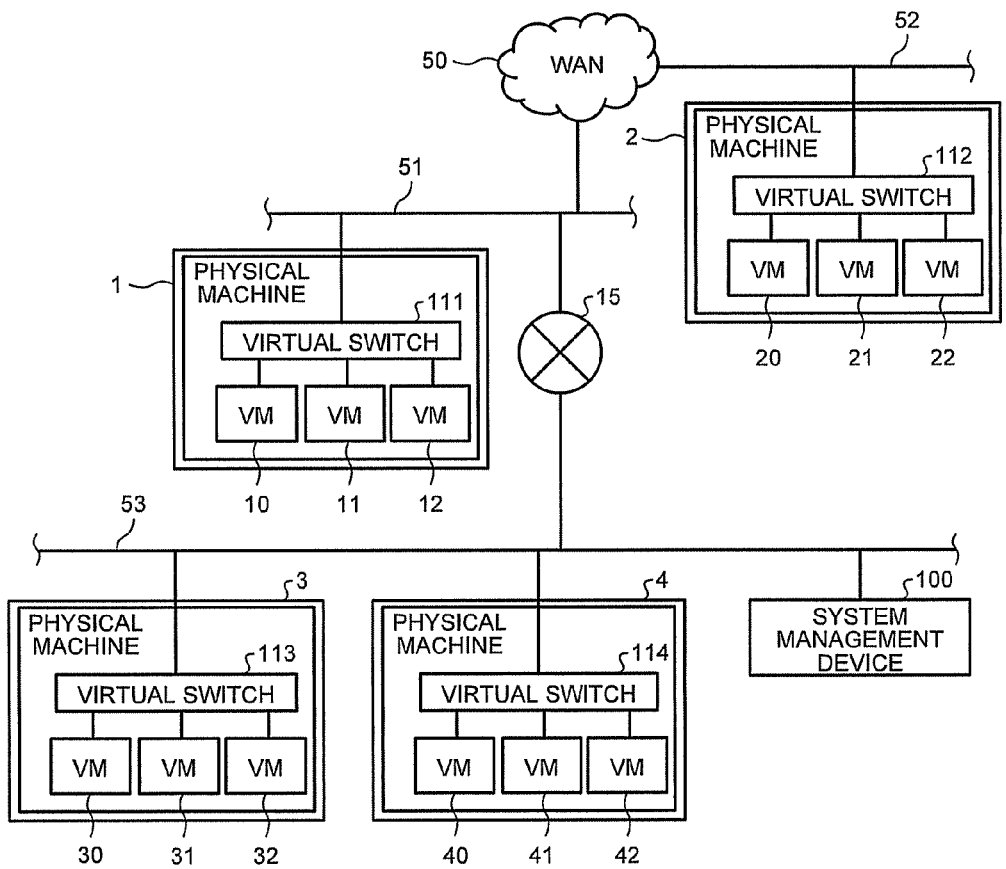
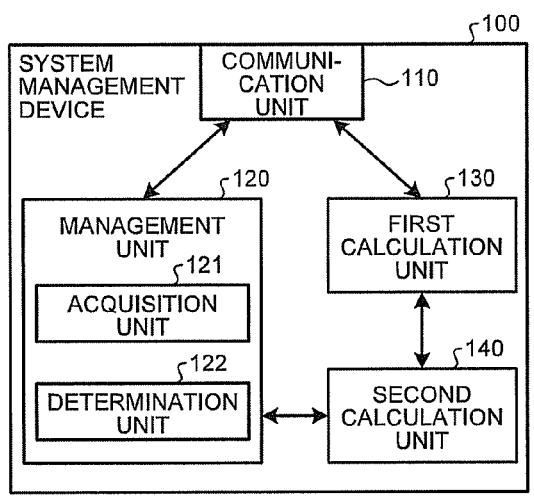

FIG.3A

|  | VM 10 | VM 11 | VM 12 | VM 20 | VM 21 | VM 22 | VM 30 | VM 31 | VM 32 | VM 40 | VM 41 | VM 42 |
|---|---|---|---|---|---|---|---|---|---|---|---|---|
| NEW VM_A | ○ |  |  |  | ○ | ○ |  |  |  |  | ○ | ○ |

FIG.3B

|  | VM 10 | VM 11 | VM 12 | VM 20 | VM 21 | VM 22 | VM 30 | VM 31 | VM 32 | VM 40 | VM 41 | VM 42 |
|---|---|---|---|---|---|---|---|---|---|---|---|---|
| NEW VM_B |  | ○ |  |  |  |  |  |  | ○ |  |  |  |

FIG.4

| RESPONSE TIME (ms) OF ping FROM PHYSICAL MACHINE 1 | PHYSICAL MACHINE 2 | PHYSICAL MACHINE 3 | PHYSICAL MACHINE 4 |
|---|---|---|---|
| FIRST | 20 | 2 | 2 |
| SECOND | 24 | 4 | 3 |
| THIRD | 22 | 2 | 3 |
| FORTH | 18 | 3 | 2 |

FIG.5

| NETWORK DISTANCE BETWEEN PHYSICAL MACHINES | PHYSICAL MACHINE 1 | PHYSICAL MACHINE 2 | PHYSICAL MACHINE 3 | PHYSICAL MACHINE 4 |
|---|---|---|---|---|
| PHYSICAL MACHINE 1 | 0 | 24 | 4 | 3 |
| PHYSICAL MACHINE 2 | 24 | 0 | 32 | 32 |
| PHYSICAL MACHINE 3 | 4 | 32 | 0 | 1 |
| PHYSICAL MACHINE 4 | 3 | 32 | 1 | 0 |

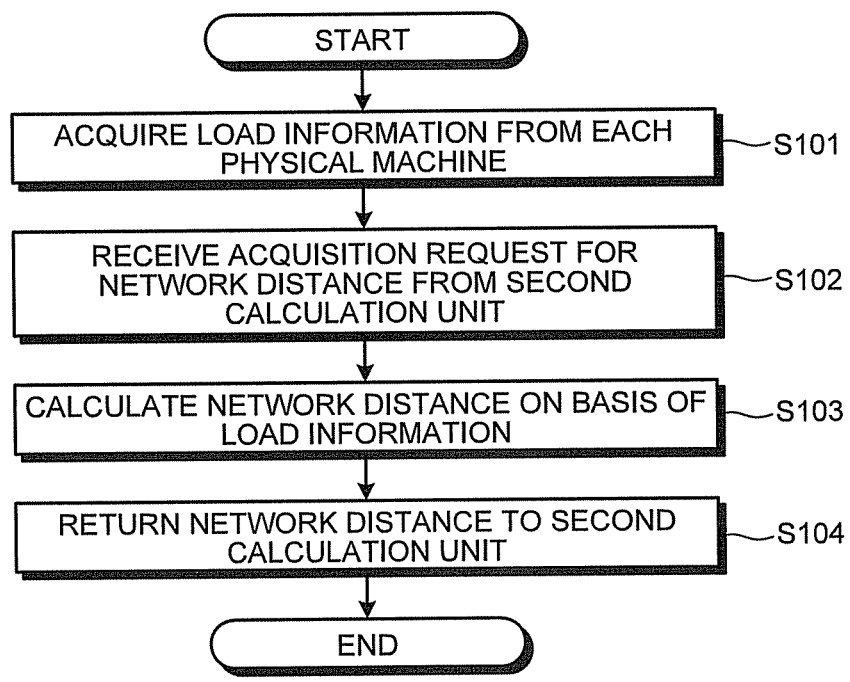

FIG.7A

| NEW VM_A | NETWORK COST |
|---|---|
| PHYSICAL MACHINE 1 | 27 |
| PHYSICAL MACHINE 2 | 56 |
| PHYSICAL MACHINE 3 | 37 |
| PHYSICAL MACHINE 4 | 35 |

FIG.7B

| NEW VM_B | NETWORK COST |
|---|---|
| PHYSICAL MACHINE 1 | 4 |
| PHYSICAL MACHINE 2 | 56 |
| PHYSICAL MACHINE 3 | 4 |
| PHYSICAL MACHINE 4 | 4 |

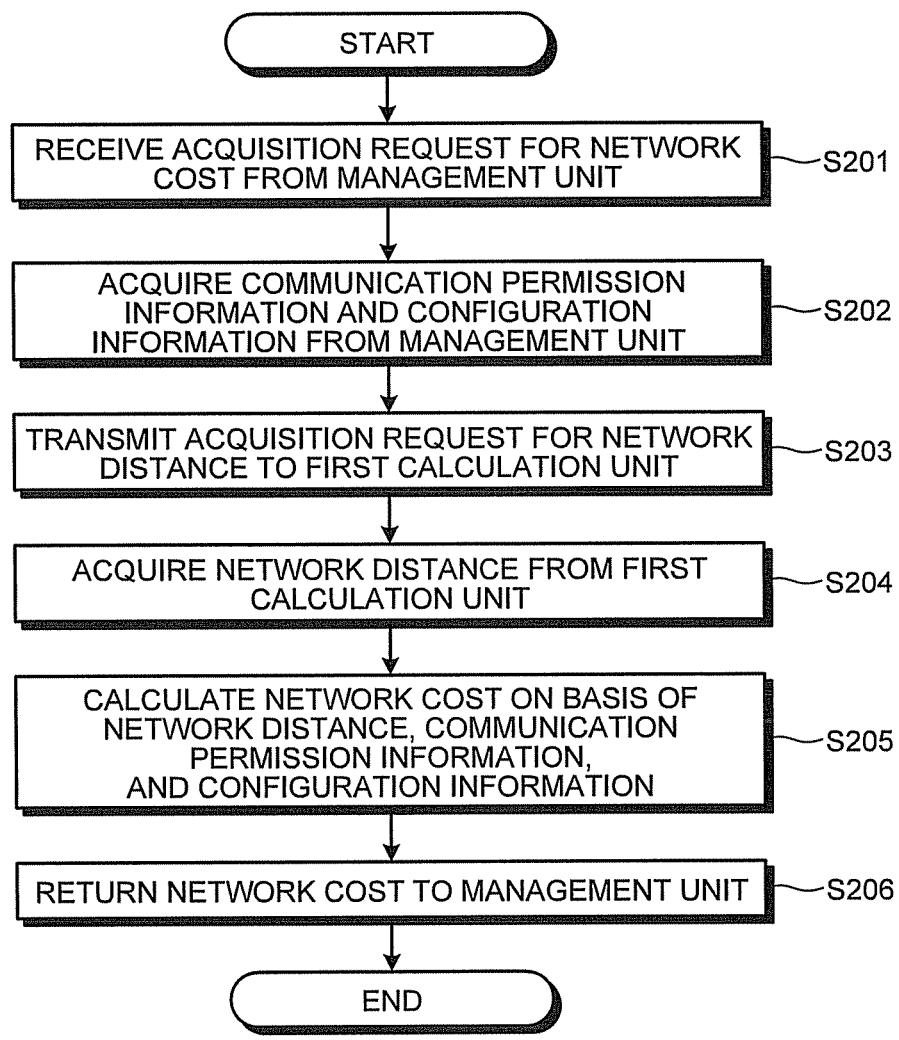

FIG.9

| USE BAND (mbps) | ETWORK APPARATUS N1 | NETWORK APPARATUS N2 | NETWORK APPARATUS N3 | NETWORK APPARATUS N4 |
|---|---|---|---|---|
| FIRST | 80 | 15 | 3 | 57 |
| SECOND | 24 | 30 | 4 | 42 |
| THIRD | 57 | 11 | 1 | 65 |
| FORTH | 33 | 8 | 7 | 38 |
| MAXIMUM BAND (mbps) | 100 | 100 | 100 | 100 |

FIG.10

| NETWORK DISTANCE BETWEEN PHYSICAL MACHINES | PHYSICAL MACHINE 1 | PHYSICAL MACHINE 2 | PHYSICAL MACHINE 3 | PHYSICAL MACHINE 4 |
|---|---|---|---|---|
| PHYSICAL MACHINE 1 | 0 | 0.079 | 0.075 | 0.075 |
| PHYSICAL MACHINE 2 | 0.079 | 0 | 0.054 | 0.054 |
| PHYSICAL MACHINE 3 | 0.075 | 0.054 | 0 | 0.011 |
| PHYSICAL MACHINE 4 | 0.075 | 0.054 | 0.011 | 0 |

FIG.11A

| NEW VM_A | NETWORK COST |
|---|---|
| PHYSICAL MACHINE 1 | 0.154 |
| PHYSICAL MACHINE 2 | 0.133 |
| PHYSICAL MACHINE 3 | 0.130 |
| PHYSICAL MACHINE 4 | 0.129 |

FIG.11B

| NEW VM_B | NETWORK COST |
|---|---|
| PHYSICAL MACHINE 1 | 0.075 |
| PHYSICAL MACHINE 2 | 0.133 |
| PHYSICAL MACHINE 3 | 0.075 |
| PHYSICAL MACHINE 4 | 0.086 |

FIG.12

|        | VM 10 | VM 11 | VM 12 | VM 20 | VM 21 | VM 22 | VM 30 | VM 31 | VM 32 | VM 40 | VM 41 | VM 42 |
|--------|-------|-------|-------|-------|-------|-------|-------|-------|-------|-------|-------|-------|
| NEW VM_C |     | 80    |       |       |       |       |       |       | 22    |       |       |       |

FIG.13

| PORT | WEIGHT |
|------|--------|
| 80   | 0.8    |
| 22   | 0.3    |
| 53   | 0.1    |

| NEW VM_C | NETWORK COST |
|---|---|
| PHYSICAL MACHINE 1 | 1.2 |
| PHYSICAL MACHINE 2 | 28.8 |
| PHYSICAL MACHINE 3 | 3.2 |
| PHYSICAL MACHINE 4 | 2.7 |

SYSTEM MANAGEMENT DEVICE, NETWORK SYSTEM, SYSTEM MANAGEMENT METHOD, AND PROGRAM

CROSS-REFERENCE TO RELATED APPLICATIONS

This application is a continuation of PCT international application Ser. No. PCT/JP2012/074271, filed on Sep. 21, 2012 which designates the United States, incorporated herein by reference.

FIELD

Embodiments described herein relate generally to a system management device, a network system, a system management method, and a program.

BACKGROUND

Cloud computing is a technique in which a user uses IT resources prepared in a data center as a service. The cloud computing is classified into SaaS (Software as a Service), PaaS (Platform as a Service), and IaaS (Infrastructure as a Service), according to a service form of the IT resources. The SaaS is to provide application software as a service, and the PaaS is to provide development environment or execution environment of the application software as a service. In addition, the IaaS operates a virtual machine on request of a user, on a physical machine connected to a network system of a data center, so as to provide resources of the virtual machine as a service.

By the cloud computing technique, the user of the IT resources can obtain advantages that reduction of initial investment can be expected and the used IT resources can be easily increased or decreased according to a necessary amount. On the other hand, in the cloud computing technique, a plurality of users share the IT resources of the data center, and thus it is pointed out that response to non-functional requirement such as performance is weak. In the IaaS, when the virtual machine is newly operated on request of the user, it is important to consider which physical machine should be operated for efficiently operating the virtual machine on the whole system, from a plurality of physical machines connected to the network system of the data center, from the viewpoint of the response to the non-functional requirement. That is, by the selection of the physical machine operating the new virtual machine, a problem may occur, in which load of a network concentrates on a specific portion, or the virtual machines which need to communicate with each other are disposed to perform communication through a network path with a long delay, so that performance necessary in the whole network system is not satisfied. For this reason, it is desirable to provide a technique of determining a physical machine optimal to operate the new virtual machine, so as to efficiently dispose the virtual machine on the whole system.

BRIEF DESCRIPTION OF THE DRAWINGS

FIG. 1 is a diagram illustrating a configuration of a network system of an embodiment;

FIG. 2 is a block diagram illustrating a functional configuration of a system management device;

FIGS. 3A and 3B are diagrams illustrating examples of communication permission information;

FIG. 4 is a diagram illustrating an example of load information;

FIG. 5 is a diagram illustrating an example of a network distance;

FIG. 6 is a flowchart illustrating process sequence of a first calculation unit;

FIGS. 7A and 7B are diagrams illustrating examples of a network cost;

FIG. 8 is a flowchart illustrating process sequence of a second calculation unit;

FIG. 9 is a diagram illustrating another example of load information;

FIG. 10 is a diagram illustrating another example of a network distance;

FIGS. 11A and 11B are diagrams illustrating another examples of a network cost;

FIG. 12 is a diagram illustrating another example of communication permission information;

FIG. 13 is a diagram illustrating an example of a weight for each port;

DETAILED DESCRIPTION

Figures 14, 15:
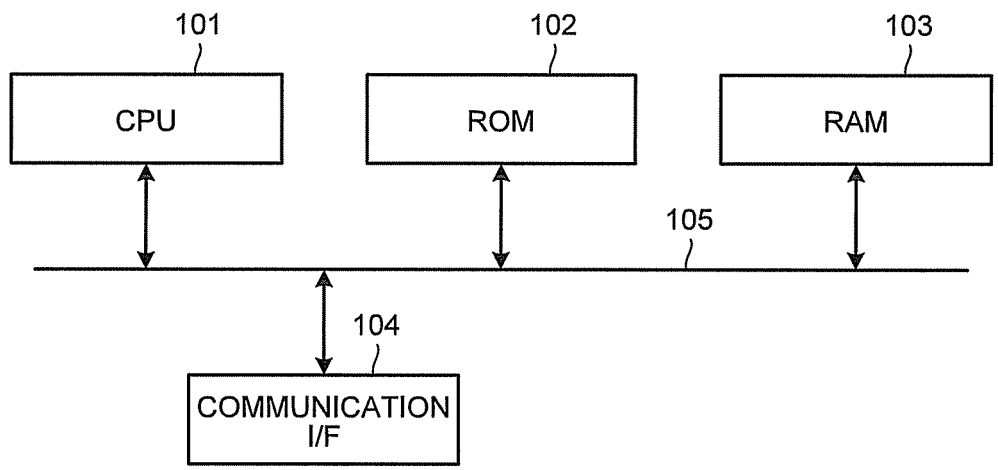
FIG. 14 is a diagram illustrating another example of a network cost.
FIG. 15 is a diagram illustrating an example of a hardware configuration of a system management device.

According to an embodiment, a system management device manages a network system in which a plurality of physical machines, which operate a virtual machine, are connected to be communicable through a network. The system management device includes a first calculator, an acquisition unit, a second calculator, and a determination unit. The first calculator is configured to calculate, for each combination of the physical machines, a network distance representing magnitude of load during communication between one of the plurality of physical machines and another physical machine. The acquisition unit is configured to acquire communication permission information representing that a first machine is permitted to communicate with which second machine among a plurality of second machines. The first machine is a virtual machine to be newly operated, and each of the second machines is a virtual machine already operated in any one of the physical machines. The second calculator is configured to calculate, for each of the physical machines, a network cost representing magnitude of load of the network system during communication between the communication-permitted second machine and the first machine when one of the physical machines operates the first machine, on the basis of the network distance calculated for each combination of the physical machines and the communication permission information. The determination unit is configured to determine which physical machine among the physical machines is to operate the first machine, using the network cost calculated for each of the physical machines.

Various embodiments will be described with reference to the accompanying drawings.

First Embodiment

FIG. 1 is a diagram illustrating a configuration of a network system according to an embodiment. The network system includes a plurality of physical machines connected to be communicable through a network. In an example of FIG. 1, four physical machines of a physical machine 1, a physical machine 2, a physical machine 3, and a physical machine 4 are connected to be communicable through the network.

The physical machine 1 is connected to a LAN (Local Area Network) 51, and the physical machine 2 is connected to a LAN 52. The LAN 51 and the LAN 52 are connected through a WAN (Wide Area Network) 50. The physical machine 3 and the physical machine 4 are connected to a LAN 53. The LAN 51 and the LAN 53 are connected through a router 15. The LAN 53 is connected to a system management device 100 that manages the whole network system, in addition to the physical machine 3 and the physical machine 4. In addition, the configuration of the network system illustrated in FIG. 1 is merely an example, and the number of physical machines and the connection type may be arbitrarily selected.

Each of the physical machines 1 to 4 provides resources for operating a virtual machine (hereinafter, referred to as a VM). In the example of FIG. 1, three VMs of a VM 10, a VM 11, and a VM 12 are operated in the physical machine 1. The VMs 10 to 12 are connected to the network through a virtual switch 111. In addition, in the physical machine 2, three VMs of a VM 20, a VM 21, and a VM 22 are operated. The VMs 20 to 22 are connected to the network through a virtual switch 112. In addition, in the physical machine 3, three VMs of a VM 30, a VM 31, and a VM 32 are operated. The VMs 30 to 32 are connected to the network through a virtual switch 113. In addition, in the physical machine 4, three VMs of a VM 40, a VM 41, and a VM 42 are operated. The VMs 40 to 42 are connected to the network through a virtual switch 114.

FIG. 2 is a block diagram illustrating a functional configuration of the system management device 100. As illustrated in FIG. 2, the system management device 100 includes a communication unit 110, a management unit 120, a first calculation unit 130, and a second calculation unit 140.

The communication unit 110 communicates with the physical machines 1 to 4 on the network, the VMs 10 to 12, 20 to 22, 30 to 32, and 40 to 42 operated in the physical machines 1 to 4, and network apparatuses (in the example of FIG. 1, the router 15 and network switches on the LANs 51 to 53).

The management unit 120 performs various managements necessary to maintain and operate the network system, and mainly performs VM management, configuration information management, and operation information acquisition. The VM management is a function of starting, changing, and eliminating the VMs. The configuration information management is a function of managing a present configuration of the network system, that is, configuration information representing which VM is being operated by which physical machine. The operation information acquisition is a function of acquiring operation information representing a present resource use rate of a CPU (Central Processing Unit) or a storage of each physical machine, from each physical machine.

In addition, the management unit 120 includes an acquisition unit 121 and a determination unit 122, as a characteristic function in the embodiment.

The acquisition unit 121 acquires communication permission information representing that a VM (hereinafter, referred to as a new VM) newly operated in the network system is permitted to communicate with which VM among the VMs 10 to 12, 20 to 22, 30 to 32, and 40 to 42 already operated in the physical machines 1 to 4 on the network. In addition, a specific example of the communication permission information will be described below.

The determination unit 122 determines which physical machine is to operate the new VM, among the physical machines 1 to 4 on the network, using a network cost to be described below, which is calculated for each of the physical machines 1 to 4 by the second calculation unit 140.

The first calculation unit 130 calculates, for each combination of two physical machines of the physical machines 1 to 4, a network distance representing magnitude of load during communication between each of the physical machines 1 to 4 on the network and the other physical machine.

For example, the first calculation unit 130 acquires and keeps load information representing a load state related to communication of the physical machines 1 to 4 on the network or the network apparatuses at an arbitrary timing. When an acquisition request for the network distance is received from the second calculation unit 140, the first calculation unit 130 calculates, for example, an average or a maximum value of load within a predetermined period for each combination of two physical machines from the kept load information, and the calculated value is set as the network distance between two physical machines. The first calculation unit 130 returns the calculated network distance to the second calculation unit 140, as a response to the acquisition request from the second calculation unit 140. A specific example of the load information and the network distance will be described below.

The second calculation unit 140 calculates, for each of the physical machines 1 to 4, a network cost representing magnitude of load of the network system during communication between the communication-permitted VM and the new VM of the already operated VMs 10 to 12, 20 to 22, 30 to 32, and 40 to 42, when one of the physical machines 1 to 4 on the network newly operates the new VM, on the basis of the network distance calculated for each combination of two physical machines by the first calculation unit 130, and the communication permission information acquired by the acquisition unit 121 of the management unit 120.

For example, when an acquisition request for the network cost is received from the management unit 120, the second calculation unit 140 acquires the communication permission information and the configuration information from the management unit 120, outputs the acquisition request for the network distance to the first calculation unit 130, and receives the network distance calculated for each combination of two physical machines from the first calculation unit 130, as a response to the acquisition request. The second calculation unit 140 selects a physical machine that is a target of calculating the network cost from the physical machines 1 to 4, and specifies the physical machines in which the VM permitted to communicate with the new VM is operated, that is, all the physical machines to be a communication correspondent, on the basis of the communication permission information and the configuration information. The second calculation unit 140 calculates the network cost for the selected physical machine by summing the network distances between the physical machine selected as the target of calculating the network cost and each of the physical machines specified as the physical machine to be the communication correspondent.

The second calculation unit 140 repeats the above-described process while changing the physical machine that is the target of calculating the network cost, and calculates the network cost for each of the physical machines 1 to 4. The second calculation unit 140 returns the calculated network cost to the management unit 120, as a response to the acquisition request from the management unit 120. The network cost calculated by the second calculation unit 140 is used as one indicator when the determination unit 122 of the management unit 120 determines the physical machine operating the new VM. In addition, a specific example of the network cost will be described below.

Next, in the network system illustrated in FIG. 1, an operation of the system management device 100 of the embodiment will be described in detail in connection with two examples of a case of newly operating a new VM_A in any one of the physical machines 1 to 4 and a case of newly operating a new VM_B in any one of the physical machines 1 to 4.

FIGS. 3A and 3B are diagrams illustrating examples of communication permission information acquired by the acquisition unit 121 of the management unit 120. As described above, the communication permission information is information representing that the new VM is permitted to communicate with which VM of the already operated VMs 10 to 12, 20 to 22, 30 to 32, and 40 to 42. For example, such communication permission information may be acquired from a rule of a firewall applied to the new VM. For example, the rule of the firewall is generated by designation of a user when operating the new VM, or by preparing a plurality of templates as a menu by the system management device 100 and selecting a template which the user wants to apply from the menu. The rule of the firewall applied to the new VM includes information of restricting a communication correspondent of the new VM, and it is possible to obtain the communication permission information of the new VM by extracting the information. In addition, the acquisition unit 121 may acquire information generated by a user or the like as information different from the firewall, as the communication permission information.

FIG. 3A illustrates the communication permission information acquired from the rule of the firewall applied to the new VM_A, in a tabular form. In the table of FIG. 3A, the VM corresponding to a column with ○ represents the VM permitted to communicate with the new VM_A, and the VM corresponding to a column with no ○ represents the VM which is not permitted to communicate with the new VM_A. That is, the communication permission information illustrated in FIG. 3A represents that the new VM_A is permitted to communicate with the VM 10, the VM 21, the VM 22, the VM 41, and the VM 42.

FIG. 3B illustrates the communication permission information acquired from the rule of the firewall applied to the new VM_B, in a tabular form. In the table of FIG. 3(*b*), the VM corresponding to a column with ○ represents the VM permitted to communicate with the new VM_B, and the VM corresponding to a column with no ○ represents the VM which is not permitted to communicate with the new VM_B. That is, the communication permission information illustrated in FIG. 3B represents that the new VM_B is permitted to communicate with the VM 11 and the VM 32.

Meanwhile, as a method of setting the rule of the firewall in the IaaS, there is a technique such as "security group". However, even the rule of the firewall is set using the technique such as "security group", it is represented whether or not communication with individual VMs is permitted when the rule is decomposed, and thus it is possible to obtain the communication permission information represented in the tabular form illustrated in FIG. 3A and FIG. 3B.

FIG. 4 is a diagram illustrating an example of load information kept by the first calculation unit 130. The first calculation unit 130 acquires load information representing a load state related to communication of the physical machines 1 to 4 on the network or the network apparatuses, to calculate the network distance between two physical machines on the network as described above, and keeps the load information. Herein, as the load information used in the calculation of the network distance, for example, a time necessary for a packet to reciprocate between two physical machines, that is, a delay time from an action to a response generated when communication is performed between two physical machines may be used.

Specifically, the first calculation unit 130 performs a process of measuring a time from when a certain physical machine sends a ping to when a response is returned from the other physical machine, for each of the other physical machines, on all the physical machines 1 to 4 on the network. The first calculation unit 130 collects the measurement results from all the physical machines 1 to 4, and keeps them as the load information.

FIG. 4 illustrates an example of the load information acquired from the physical machine 1 by the first calculation unit 130, and illustrates a result of measuring a time (ms) from when a ping is sent from the physical machine 1 to when a response is returned from each of the physical machines 2 to 4, in a tabular form. In FIG. 4, the example in which the measurement is performed four times is illustrated, but the number of times of measurement should not be necessarily four. In addition, the measurement may be regularly performed, for example, at a regular interval before requesting the new VM to operate, and may be performed after requesting the new VM to operate.

The first calculation unit 130 acquires the load information as illustrated in FIG. 4 from each of the physical machines 1 to 4 on the network and keeps it. When an acquisition request of the network distance is received from the second calculation unit 140, the first calculation unit 130 calculates, for each combination of two physical machines, the network distance between two physical machines on the network using the kept load information.

As a method of calculating the network distance from the load information, various methods are conceivable. For example, there is a method in which a maximum value of the value (in the example of FIG. 4, a response time of a ping (a delay time)) kept as the load information is the network distance between two physical machines. In this case, using the load information exemplified in FIG. 4, the network distance between the physical machine 1 and the physical machine 2 is 24, the network distance between the physical machine 1 and the physical machine 3 is 4, and the network distance between the physical machine 1 and the physical machine 4 is 3. In addition, an average value of the values kept as the load information may be the network distance between two physical machines. In this case, using the load information exemplified in FIG. 4, the network distance between the physical machine 1 and the physical machine 2 is 21, the network distance between the physical machine 1 and the physical machine 3 is 2.75, and the network distance between the physical machine 1 and the physical machine 4 is 2.5. In addition, for example, a method in which a minimum value of the values kept as the load information is the network distance between two physical machines, and a method in which a weight is attached to the value kept as the load information, which is weighed as much as new data, are conceivable.

The first calculation unit 130 calculates the network distance for each combination of two physical machines according to the method described above. FIG. 5 is a diagram illustrating an example of the network distance calculated by the first calculation unit 130. The example of FIG. 5 is an example of using a delay time illustrated in FIG. 4 as the load information and calculating a maximum value thereof as the network distance, and the network distance of each combination of two physical machines of the physical machines 1 to 4 is represented in a tabular form. The first calculation unit 130 calculates the network distance of each combination of two physical machines illustrated in FIG. 5, according to the acquisition request from the second calculation unit 140. The first calculation unit 130 returns the calculated network distance to the second calculation unit 140, as a response to the acquisition request from the second calculation unit 140.

FIG. 6 is a flowchart illustrating process sequence of the first calculation unit 130. First, the first calculation unit 130 acquires the load information from each of the physical machines 1 to 4 on the network at an arbitrary timing, and keeps the acquired load information (Step S101). When the acquisition request for the network distance is received from the second calculation unit 140 (Step S102), the first calculation unit 130 calculates the network distance for each combination of two physical machines of the physical machines 1 to 4 using the load information acquired in Step S101 (Step S103). The first calculation unit 130 returns the network distance calculated in Step S103 to the second calculation unit 140, as a response to the acquisition request received in Step S102 (Step S104).

As described above, the second calculation unit 140 calculates, for each of the physical machines 1 to 4 on the network, the network cost when the new VM is operated on the basis of the communication permission information and the configuration information acquired from the management unit 120, and the network distance acquired from the first calculation unit 130.

First, a method of calculating, by the second calculation unit 140, the network cost when the new VM_A is operated, using the communication permission information illustrated in FIG. 3A and the network distance illustrated in FIG. 5, will be described. From the communication permission information illustrated in FIG. 3A, it is known that the new VM_A may communicate with the physical machine 1 in which the VM 10 is operated, the physical machine 2 in which the VM 21 and the VM 22 are operated, and the physical machine 4 in which the VM 41 and the VM 42 are operated.

Herein, considering a case of operating the new VM_A in the physical machine 1, when the new VM_A communicates with the VM 10, the physical machine 1 does not communicate with the other physical machines. When the new VM_A communicates with the VM 21 or the VM 22, the physical machine 1 communicates with the physical machine 2. When the new VM_A communicates with the VM 41 or the VM 42, the physical machine 1 communicates with the physical machine 4. Accordingly, the network cost when operating the new VM_A in the physical machine 1 may be calculated by summing the network distance between the physical machine 1 and the physical machine 2 and the network distance between the physical machine 1 and the physical machine 4. In the example illustrated in FIG. 5, the network distance between the physical machine 1 and the physical machine 2 is 24, the network distance between the physical machine 1 and the physical machine 4 is 3, and thus the network cost when operating the new VM_A in the physical machine 1 is 27.

In a case of operating the new VM_A in the physical machine 2, when the new VM_A communicates with the VM 10, the physical machine 2 communicates with the physical machine 1. When the new VM_A communicates with the VM 21 or the VM 22, the physical machine 2 does not communicate with the other physical machines. When the new VM_A communicates with the VM 41 or the VM 42, the physical machine 2 communicates with the physical machine 4. Accordingly, the network cost when operating the new VM_A in the physical machine 2 may be calculated by summing the network distance between the physical machine 2 and the physical machine 1 and the network distance between the physical machine 2 and the physical machine 4. In the example illustrated in FIG. 5, the network distance between the physical machine 2 and the physical machine 1 is 24, the network distance between the physical machine 2 and the physical machine 4 is 32, and thus the network cost when operating the new VM_A in the physical machine 2 is 56.

In addition, in a case of operating the new VM_A in the physical machine 3, when the new VM_A communicates with the VM 10, the physical machine 3 communicates with the physical machine 1. When the new VM_A communicates with the VM 21 or the VM 22, the physical machine 3 communicates with the physical machine 2. When the new VM_A communicates with the VM 41 or the VM 42, the physical machine 3 communicates with the physical machine 4. Accordingly, the network cost when operating the new VM_A in the physical machine 3 may be calculated by summing the network distance between the physical machine 3 and the physical machine 1, the network distance between the physical machine 3 and the physical machine 2, and the network distance between the physical machine 3 and the physical machine 4. In the example illustrated in FIG. 5, the network distance between the physical machine 3 and the physical machine 1 is 4, the network distance between the physical machine 3 and the physical machine 2 is 32, the network distance between the physical machine 3 and the physical machine 4 is 1, and thus the network cost when operating the new VM_A in the physical machine 3 is 37.

In addition, in a case of operating the new VM_A in the physical machine 4, when the new VM_A communicates with the VM 10, the physical machine 4 communicates with the physical machine 1. When the new VM_A communicates with the VM 21 or the VM 22, the physical machine 4 communicates with the physical machine 2. When the new VM_A communicates with the VM 41 or the VM 42, the physical machine 4 does not communicate with the other physical machines. Accordingly, the network cost when operating the new VM_A in the physical machine 4 may be calculated by summing the network distance between the physical machine 4 and the physical machine 1 and the network distance between the physical machine 4 and the physical machine 2. In the example illustrated in FIG. 5, the network distance between the physical machine 4 and the physical machine 1 is 3, the network distance between the physical machine 4 and the physical machine 2 is 32, and thus the network cost when operating the new VM_A in the physical machine 4 is 35.

Next, a method of calculating, by the second calculation unit 140, the network cost when operating the new VM_B, using the communication permission information illustrated in FIG. 3B and the network distance illustrated in FIG. 5, will be described. From the communication permission information illustrated in FIG. 3B, it is known that the new VM_B may communicate with the physical machine 1 in which the VM 11 is operated and the physical machine 3 in which the VM 32 is operated.

Herein, considering a case of operating the new VM_B in the physical machine 1, when the new VM_B communicates with the VM 11, the physical machine 1 does not communicate with the other physical machines. When the new VM_B communicates with the VM 32, the physical machine 1 communicates with the physical machine 3. Accordingly, the network cost when operating the new VM_B in the physical machine 1 is the network distance between the physical machine 1 and the physical machine 3. In the example illustrated in FIG. 5, the network distance between the physical machine 1 and the physical machine 3 is 4, and thus the network cost when operating the new VM_B in the physical machine 1 is 4.

In a case of operating the new VM_B in the physical machine 2, when the new VM_B communicates with the VM 11, the physical machine 2 communicates with the physical machine 1. When the new VM_B communicates with the VM 32, the physical machine 2 communicates with the physical machines 3. Accordingly, the network cost when operating the new VM_B in the physical machine 2 may be calculated by summing the network distance between the physical machine 2 and the physical machine 1 and the network distance between the physical machine 2 and the physical machine 3. In the example illustrated in FIG. 5, the network distance between the physical machine 2 and the physical machine 1 is 24, the network distance between the physical machine 2 and the physical machine 3 is 32, and thus the network cost when operating the new VM_B in the physical machine 2 is 56.

In addition, in a case of operating the new VM_B in the physical machine 3, when the new VM_B communicates with the VM 11, the physical machine 3 communicates with the physical machine 1. When the new VM_B communicates with the VM 32, the physical machine 3 does not communicate with the other physical machines. Accordingly, the network cost when operating the new VM_B in the physical machine 3 is the network distance between the physical machine 3 and the physical machine 1. In the example illustrated in FIG. 5, the network distance between the physical machine 3 and the physical machine 1 is 4, and thus the network cost when operating the new VM_B in the physical machine 3 is 4.

In addition, in a case of operating the new VM_B in the physical machine 4, when the new VM_B communicates with the VM 11, the physical machine 4 communicates with the physical machine 1. When the new VM_B communicates with the VM 32, the physical machine 4 communicates with the physical machine 3. Accordingly, the network cost when operating the new VM_B in the physical machine 4 may be calculated by summing the network distance between the physical machine 4 and the physical machine 1 and the network distance between the physical machine 4 and the physical machine 3. In the example illustrated in FIG. 5, the network distance between the physical machine 4 and the physical machine 1 is 3, the network distance between the physical machine 4 and the physical machine 3 is 1, and thus the network cost when operating the new VM_B in the physical machine 4 is 4.

FIGS. 7A and 7B are diagrams illustrating examples of the network cost calculated by the second calculation unit 140, FIG. 7A illustrates the network cost when operating the new VM_A, and FIG. 7B illustrates the network cost when operating the new VM_B, in a tabular form, respectively.

The second calculation unit 140 calculates the network cost of each of the physical machines 1 to 4 illustrated in FIG. 7A or FIG. 7B according to the acquisition request for the network cost from the management unit 120, and returns the calculated network cost of each of the physical machines 1 to 4 to the management unit 120, as a response to the acquisition request from the management unit 120.

The network cost transmitted from the second calculation unit 140 to the management unit 120 is used as one indicator when the determination unit 122 of the management unit 120 determines a physical machine to operate the new VM, from the physical machines 1 to 4. For example, when the network cost of each of the physical machines 1 to 4 is acquired from the second calculation unit 140, the determination unit 122 acquires a total cost representing an aptitude degree of the physical machine operating the new VM, using the network cost of each of the physical machines 1 to 4 and the resource use rate of each of the physical machines 1 to 4, and determines a physical machine with the lowest total cost as the physical machine operating the new VM.

FIG. 8 is a flowchart illustrating process sequence of the second calculation unit 140. When the acquisition request for the network cost is received from the management unit 120 (Step S201), the second calculation unit 140 acquires the communication permission information and the configuration information from the management unit 120 (Step S202). Then, the second calculation unit 140 transmits the acquisition request for the network distance to the first calculation unit 130 (Step S203). When the network distance transmitted from the first calculation unit 130 is acquired as a response to the acquisition request of Step S203 (Step S204), the second calculation unit 140 calculates the network cost of each of the physical machines 1 to 4 based on the communication permission information and the configuration information acquired in Step S202 and the network distance acquired in Step S204 (Step S205). The second calculation unit 140 returns the network cost calculated in Step S205 to the management unit 120, as a response to the acquisition request received in Step S201 (Step S206).

As described above in detail by the specific examples, the system management device 100 according to the embodiment calculates the network distance for each combination of two physical machines of the physical machines 1 to 4 on the network, calculates the network cost of each of the physical machines 1 to 4 using the network distance and the communication permission information, and determines the physical machine operating the new VM from the physical machines 1 to 4 using the network cost as one indicator. Therefore, according to the system management device 100 according to the embodiment, it is possible to determine the physical machine optimal to operate the new VM by assuming which communication is performed when operating the new VM, as well as the present state of each of the physical machines 1 to 4 on the network, and thus it is possible to operate the new VM in more efficient disposition on the whole system.

As the related art, for example, there is a method of assuming optimal disposition of the VM from the present operation information of all the physical machines, and performing rearrangement. However, in the related art, when the VM is not actually operated in either physical machine, the operation information cannot be collected, and the optimal disposition cannot be assumed before operating the VM. For this reason, although the optimal disposition can be assumed, it is necessary to perform a very high cost work called live migration of moving the operated VM between the physical machines. In contrast, in the embodiment, it is possible to determine the physical machine optimal to operate the new VM before operating the new VM, and thus it is possible to realize more efficient disposition of the VM on the whole system, without performing the high cost work such as the live migration.

In addition, as another related art, there is a method of determining the physical machine operating the new VM based on the operation information of all the physical machines on the network. According to the related art, it is possible to operate the new VM in the physical machine with a margin in resources, and thus it is possible to achieve smoothing of use resources of the physical machine. However, in the related art, the physical machine operating the new VM is determined, without considering that communication is performed after the new VM is operated. Accordingly, the new VM is disposed at a position very far away from a communication correspondent on the network path, and unnecessary network traffic on the whole system may be generated. In contrast, in the embodiment, the optimal physical machine is determined considering the communication after the new VM is operated, and thus it is possible to operate the new VM in more efficient disposition on the whole system.

Second Embodiment

Next, a second embodiment will be described. The second embodiment is different in the load information acquired to calculate the network distance by the first calculation unit 130, from the first embodiment. That is, the first calculation unit 130 of the first embodiment acquires the delay time generated when performing communication between two physical machines, as the load information, but the first calculation unit 130 of the second embodiment acquires a band use amount of a network apparatus on the network path used when performing communication between two physical machines, as the load information. The other configuration is the same as that of the first embodiment.

Hereinafter, the description of the same configuration as that of the first embodiment will not be made, and only difference from the first embodiment will be described. In addition, hereinafter, the first calculation unit 130 of the second embodiment is represented by a first calculation unit 130A to discriminate from the first embodiment.

The first calculation unit 130A specifies the network path between two physical machines for each combination of two physical machines on the network. The first calculation unit 130A acquires each present band use amount from a network apparatus (in the example of FIG. 1, the router 15 or network switches on the LANs 51 to 53) on each network path at an arbitrary timing, and keeps the band use amount as the load information.

FIG. 9 is a diagram illustrating an example of the load information kept in the first calculation unit 130A. In the example of FIG. 9, the network switch on the LAN 51 connected to the physical machine 1 is represented by a network apparatus N1, the router 15 between the LAN 51 and the LAN 53 is represented by a network apparatus N2, the network switch on the LAN 53 connected to the physical machine 3 and the physical machine 4 is represented by a network apparatus N3, the network switch on the LAN 52 connected to the physical machine 2 is represented by a network apparatus N4, and the band use amount acquired from each of the network apparatuses N1 to N4 is represented in a tabular form. In FIG. 9, an example of acquiring the band use amount of each of the network apparatuses N1 to N4 four times at different timings is illustrated, but the number of times of acquiring the band use amount should not be necessarily four. In addition, the acquisition of the band use amount may be continuously performed, may be regularly performed at a regular interval before the new VM is requested to operate, or may be performed after the new VM is requested to operate.

The first calculation unit 130A acquires and keeps the load information illustrated in FIG. 9 from each of the network apparatuses N1 to N4 on the network. When the acquisition request for the network distance is received from the second calculation unit 140, the first calculation unit 130A calculates the network distance between two physical machines on the network for each combination of two physical machines, using the kept load information.

For example, the first calculation unit 130A acquires a band remaining amount by subtracting a maximum value of the band use amount from a maximum band of the network apparatus using the maximum value of the band use amount of the network apparatus kept as the load information. The maximum band of the network apparatus may be kept in advance, for example, by measuring the maximum band before the network apparatus is mounted on the system. When band remaining amount is acquired for all the network apparatuses on the network path between two physical machines, the first calculation unit 130A calculates a sum of reciprocals of the band remaining amounts of all the network apparatuses as the network distance between two physical machines. For example, the network apparatuses on the network path between the physical machine 1 and the physical machine 3 are the network apparatus N1, the network apparatus N2, and the network apparatus N3. When the load information exemplified in FIG. 9 is used, the band remaining amount of the network apparatus N1 is 20, the band remaining amount of the network apparatus N2 is 70, and the band remaining amount of the network apparatus N3 is 93. Therefore, the network distance between the physical machine 1 and the physical machine 3 is 1/20+1/70+1/93=0.075.

The first calculation unit 130A calculates the network distance for each combination of two physical machines according to the method described above. FIG. 10 is a diagram illustrating an example of the network distance calculated by the first calculation unit 130A. The example of FIG. 10 is an example using the band use amounts of the network apparatuses N1 to N4 illustrated in FIG. 9 as the load information, in which the network distance of each combination of two physical machines of the physical machines 1 to 4 is represented in a tabular form. The first calculation unit 130A calculates the network distance of each combination of two physical machines illustrated in FIG. 10 according to the acquisition request from the second calculation unit 140, and returns the network distance to the second calculation unit 140.

FIGS. 11A and 11B are diagrams illustrating examples of network costs calculated by the second calculation unit 140 based on the communication permission information illustrated in FIGS. 3A and 3B and the network distance illustrated in FIG. 10, FIG. 11A illustrates the network cost when operating the new VM_A, and FIG. 11B illustrates the network cost when operating the new VM_B, in a tabular form, respectively.

As described above, the sum of the reciprocals of the band remaining amounts of all the network apparatuses on the network path between two physical machines is the network distance between two physical machines. When there is even one network apparatus in which most of the band is used, the value of the network distance is very large. For this reason, when the new VM is operated in the physical machine using the network path that passes through such a network apparatus, the network cost is very large. As a result, the physical machine operating the new VM is determined to more effectively utilize the network resources on the whole system.

In addition, in the example, the first calculation unit 130A calculates the sum of the reciprocals of the band remaining amounts of all the network apparatuses on the network path between two physical machines, as the network distance between two physical machines, but the network distance may be calculated by the other methods. For example, the sum of the band use amounts of all the network apparatuses on the network path between two physical machines may be calculated as the network distance between two physical machines, or the maximum value of the band use amounts of all the network apparatuses on the network path between two physical machines may be the network distance between two physical machines.

As described above, according to the embodiment, the network distance between two physical machines is calculated using the band use amounts of the network apparatuses on the network path between two physical machines. Accordingly, in addition to the effect of the first embodiment, furthermore, it is possible to determine the physical machine optimal to operate the new VM by reflecting also the operation state of the network resources, and thus it is possible to operate the new VM in more efficient disposition on the whole system.

The load information used to calculate the network distance between two physical hosts, or a method of calculating the network distance using the load information is not limited to two examples described in the first embodiment and the second embodiment, and various other aspects and combination thereof may be used.

Third Embodiment

Next, a third embodiment will be described. The third embodiment is different in the communication permission information acquired by the acquisition unit 121 and the method of calculating the network cost by the second calculation unit 140 using the communication permission information, from the first embodiment. That is, the acquisition unit 121 of the first embodiment acquires the communication permission information representing the VM permitted to communicate with the new VM from the rule of the firewall applied to the new VM, but the acquisition unit 121 of the third embodiment acquires communication permission information in which a port number used in communication is further designated, from the rule of the firewall applied to the new VM. In addition, the second calculation unit 140 of the first embodiment calculates the network cost by summing the network distances between the physical machine of the target of calculating the network cost and each of the physical machines in which the communication-permitted VM with the communication permission information is operated, but the second calculation unit 140 of the third embodiment calculates the network cost by summing values obtained by multiplying a weight corresponding to a port number designated in the communication permission information by the network distances between the physical machine of the target of calculating the network cost and each of the physical machines in which the communication-permitted VM with the communication permission information is operated. The other configuration is the same as that of the first embodiment.

Hereinafter, the description of the same configuration as that of the first embodiment will not be made, and only difference from the first embodiment will be described. Hereinafter, the acquisition unit 121 of the third embodiment is represented by an acquisition unit 121A to discriminate from the first embodiment, and the second calculation unit 140 of the third embodiment is represented by a second calculation unit 140A to discriminate from the first embodiment.

FIG. 12 is a diagram illustrating an example of communication permission information acquired by the acquisition unit 121A, and illustrates communication permission information acquired from the rule of the firewall applied to the new VM_C in a tabular form. In the table of FIG. 12, the VM corresponding to a column in which a numerical value is entered represents the VM permitted to communicate with the new VM_A, the numerical value represents a port number designated as a port used when communicating with the VM. That is, in the communication permission information illustrated in FIG. 12, the new VM_C is permitted to communicate with the VM 11 and the VM 32, and it is illustrated that the port of the port number 80 is used when communicating with the VM 11, and the port of the port number 22 is used when communicating with the VM 32.

FIG. 13 is a diagram illustrating an example of a weight of each port. The second calculation unit 140A keeps information in which the weight of each port is described as illustrated in FIG. 13, and uses the information when calculating the network cost. That is, the second calculation unit 140A multiplies the weight corresponding to the number of the port used in communication on the network distance between two physical servers, and calculates network cost by summing the values.

The weight of each port is determined on the basis of measurement value representing how large data is used in general of protocol generally used in each port. In the example of FIG. 13, the port of the port number 80 is used mainly in HTTP (Hyper Text Transfer Protocol), there are many cases where a data amount is very large, and thus the value of the weight is large. In addition, the port of the port number 53 is a DNS (Domain Name System), there are few cases where large data flows, and thus the value of the weight is small. Such a weight may be statistically calculated, for example, by actually operating a system. In addition, such a weight may be empirically set by a person. When the person empirically sets the weight, the weight may be set to include the view point how much response speed is required. For example, it is conceivable that the value of the weight value is increased as much as the port needing a high speed response.

Herein, a method will be described in which the second calculation unit 140A calculates the network cost when operating the new VM_C, using the communication permission information illustrated in FIG. 12, the information of the weight of each port illustrated in FIG. 13, and the network distance illustrated in FIG. 5. From the communication permission information illustrated in FIG. 12, it is known that the new VM_C may communicate with the physical machine 1 in which the VM 11 is operated and the physical machine 3 in which the VM 32 is operated. In addition, it is known that, when the new VM_C communicates with the physical machine 1, the port of the port number 80 is used, and when the new VM_C communicates with the physical machine 3, the port of the port number 22 is used.

Herein, considering a case of operating the new VM_C in the physical machine 1, when the new VM_C communicates with the VM 11, the physical machine 1 does not communicate with the other physical machines, and when the new VM_C communicates with the VM 32, the physical machine 1 communicates with the physical machine 3. Accordingly, the network cost when operating the new VM_C in the physical machine 1 is a value obtained by multiplying the weight corresponding to the port number 22 by the network distance between the physical machine 1 and the physical machine 3. In the example illustrated in FIG. 5, the network distance between the physical machine 1 and the physical machine 3 is 4. In the example illustrated in FIG. 13, the value of the weight corresponding to the port number 22 is 0.3. Accordingly, the network cost when operating the new VM_C in the physical machine 1 is 1.2.

In addition, considering a case of operating the new VM_C in the physical machine 2, when the new VM_C communicates with the VM 11, the physical machine 2 communicates with the physical machine 1, and when the new VM_C communicates with the VM 32, the physical machine 2 communicates with the physical machine 3. Accordingly, the network cost when operating the new VM_C in the physical machine 2 may be calculated by summing a value obtained by multiplying the weight corresponding to the port number 80 by the network distance between the physical machine 2 and the physical machine 1, and a value obtained by multiplying the weight corresponding to the port number 22 by the network distance between the physical machine 2 and the physical machine 3. In the example illustrated in FIG. 5, the network distance between the physical machine 2 and the physical machine 1 is 24, and the network distance between the physical machine 2 and the physical machine 3 is 32. In the example illustrated in FIG. 13, the value of the weight corresponding to the port number 80 is 0.8, and the value of the weight corresponding to the port number 22 is 0.3. Accordingly, the network cost when operating the new VM_C in the physical machine 2 is 28.8.

In addition, considering a case of operating the new VM_C in the physical machine 3, when the new VM_C communicates with the VM 11, the physical machine 3 communicates with the physical machine 1, and when the new VM_C communicates with the VM 32, the physical machine 3 does not communicate with the other physical machines. Accordingly, the network cost when operating the new VM_C in the physical machine 3 is a value obtained by multiplying the weight corresponding to the port number 80 by the network distance between the physical machine 3 and the physical machine 1. In the example illustrated in FIG. 5, the network distance between the physical machine 3 and the physical machine 1 is 4. In the example illustrated in FIG. 13, the value of the weight corresponding to the port number 80 is 0.8. Accordingly, the network cost when operating the new VM_C in the physical machine 3 is 3.2.

In addition, considering a case of operating the new VM_C in the physical machine 4, when the new VM_C communicates with the VM 11, the physical machine 4 communicates with the physical machine 1, and when the new VM_C communicates with the VM 32, the physical machine 4 communicates with the physical machine 3. Accordingly, the network cost when operating the new VM_C in the physical machine 4 may be calculated by summing a value obtained by multiplying the weight corresponding to the port number 80 by the network distance between the physical machine 4 and the physical machine 1, and a value obtained by multiplying the weight corresponding to the port number 22 by the network distance between the physical machine 4 and the physical machine 3. In the example illustrated in FIG. 5, the network distance between the physical machine 4 and the physical machine 1 is 3, and the network distance between the physical machine 4 and the physical machine 3 is 1. In the example illustrated in FIG. 13, the value of the weight corresponding to the port number 80 is 0.8, and the value of the weight corresponding to the port number 22 is 0.3. Accordingly, the network cost when operating the new VM_C in the physical machine 4 is 2.7.

FIG. 14 is a diagram illustrating an example of the network cost calculated by the second calculation unit 140A, and illustrates the network cost when operating the new VM_C in a tabular form. The second calculation unit 140A calculates the network cost of each of the physical machines 1 to 4 illustrated in FIG. 14 according to the acquisition request for the network cost from the management unit 120, and returns the calculated network cost of each of the physical machines 1 to 4 to the management unit 120, as a response to the acquisition request from the management unit 120.

As described above, according to the embodiment, the network cost is calculated by multiplying the network distance by the weight corresponding to the port number used when the new VM performs communication. Accordingly, in addition to the effect of the first embodiment, furthermore, it is possible to determine the physical machine optimal to operate the new VM by additionally considering the data amount of communication or the necessary response speed, and thus it is possible to operate the new VM in more efficient disposition on the whole system.

Meanwhile, a method of weighting about the network distance is not limited to the weight corresponding to the port number used in communication, for example, the weighting may be performed using other information included in the rule of the firewall applied to the new VM, such as the information of the security group described above.

The first to third embodiments have been described above, but each function of the system management device 100 according to such embodiments may be realized, for example, by executing a predetermined program on the system management device 100. In this case, for example, as illustrated in FIG. 15, the system management device 100 has a hardware configuration using a general computer provided with a control device such as a CPU (Central Processing Unit) 101, a memory device such as a ROM (Read Only Memory) 102, and a RAM (Random Access Memory) 103, a communication I/F 104 that is connected to a network to perform communication, and a bus 105 that connects units.

A program executed in the system management device 100 according to the embodiment is recorded in a computer-readable recording medium such as a CD-ROM (Compact Disk Read Only Memory), a flexible disk (FD), a CD-R (Compact Disk Recordable), and a DVD (Digital Versatile Disc) as installable-type or executable-type files, and is provided as a computer program product.

In addition, the program executed in the system management device 100 according to the embodiment may be configured to be stored in a computer connected to a network such as Internet and to be provided by downloading through the network. In addition, the program executed in the system management device 100 according to the embodiment may be configured to be provided or distributed through the network such as Internet.

In addition, the program executed in the system management device 100 according to the embodiment may be configured to be provided by recording the program in the ROM 102 or the like in advance.

The program executed in the system management device 100 according to the embodiment has a module configuration including the processing units (the communication unit 110, the management unit 120 (the acquisition unit 121 and the determination unit 122), the first calculation unit 130, and the second calculation unit 140) realizing the functions of the system management device 100. As actual hardware, for example, the CPU 101 (the processor) reads and executes the program from the recording medium, each processing unit described above is thereby loaded on a main memory device, and each processing unit described above is generated on the main memory device. In addition, in the system management device 100 according to the embodiment, a part or all of the processing units described above may be realized using dedicated hardware such as ASIC (Application Specific Integrated Circuit) and FPGA (Field-Programmable Gate Array).

In addition, in the system management device 100 according to the embodiment, it is not necessary to realize each processing unit described above by one device, and the processing units described above may be dispersed in a plurality of devices to be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system management device that manages a network system in which a plurality of physical machines, which operate a virtual machine, are connected to be communicable through a network, the system management device comprising:
a computer processor coupled to a memory;
a first calculator configured to calculate, for each combination of the physical machines, a network distance representing magnitude of load during communication between one of the plurality of physical machines and another physical machine;
an acquisition unit configured to acquire communication permission information representing that a first machine is permitted to communicate with which second machine among a plurality of second machines, the first machine being a virtual machine to be newly operated, and each of the second machines being a virtual machine already operated in any one of the physical machines;
a second calculator configured to calculate, for each of the physical machines, a network cost representing magnitude of load of the network system during communication between the communication-permitted second machine and the first machine when one of the physical machines operates the first machine, on the basis of the network distance calculated for each combination of the physical machines and the communication permission information; and
a determination unit configured to determine which physical machine among the physical machines is to operate the first machine, using the network cost calculated for each of the physical machines;
wherein the acquisition unit acquires the communication permission information in which a port number used in communication is designated, from a rule of a firewall applied to the first machine and wherein the second calculator calculates the network cost by summing values obtained by multiplying a weight based on the port number designated in the communication permission information by the network distances between the physical machine which is a target of calculating the network cost, and each of the physical machines in which the second machine permitted to communicate with the first machine is operated.

2. The device according to claim 1, wherein the second calculator calculates the network cost by summing the network distances between the physical machine which is a target of calculating the network cost, and each of the physical machines in which the second machine permitted to communicate with the first machine is operated.

3. The device according to claim 1, wherein the first calculator calculates the network distance using a delay time generated by communication between one of the physical machines and the other physical machine.

4. The device according to claim 1, wherein the first calculator calculates the network distance using a band use amount of a network apparatus on a network path used when one of the physical machines communicates with the other physical machine.

5. A network system in which a plurality of physical machines, which operate a virtual machine, and a system management device are connected to be communicable through a network, wherein the system management device comprising:
a computer processor coupled to a memory;
a first calculator configured to calculate, for each combination of the physical machines, a network distance representing magnitude of load during communication between one of the plurality of physical machines and another physical machine;
an acquisition unit configured to acquire communication permission information representing that a first machine is permitted to communicate with which second machine among a plurality of second machines, the first machine being a virtual machine to be newly operated, and each of the second machines being a virtual machine already operated in any one of the physical machines;
a second calculator configured to calculate, for each of the physical machines, a network cost representing magnitude of load of the network system during communication between the communication-permitted second machine and the first machine when one of the physical machines operates the first machine, on the basis of the network distance calculated for each combination of the physical machines and the communication permission information; and
a determination unit configured to determine which physical machine among the physical machines is to operate the first machine, using the network cost calculated for each of the physical machines;
wherein the acquisition unit acquires the communication permission information in which a port number used in communication is designated, from a rule of a firewall applied to the first machine and wherein the second calculator calculates the network cost by summing values obtained by multiplying a weight based on the port number designated in the communication permission information by the network distances between the physical machine which is a target of calculating the network cost, and each of the physical machines in which the second machine permitted to communicate with the first machine is operated.

6. A system management method which is performed in a system management device that manages a network system in which a plurality of physical machines, which operate a virtual machine, are connected to be communicable through a network, the system management method comprising:
calculating, for each combination of the physical machines, a network distance representing magnitude of load during communication between one of the plurality of physical machines and another physical machine, by a first calculator of the system management device;
acquiring communication permission information representing that a first machine is permitted to communicate with which second machine among a plurality of second machines, the first machine being a virtual machine to be newly operated, and each of the second machines being a virtual machine already operated in any one of the physical machines, by an acquisition unit of the system management device;
calculating, for each of the physical machines, a network cost representing magnitude of load of the network system during communication between the communication-permitted second machine and the first machine when one of the physical machines operates the first machine, on the basis of the network distance calculated for each combination of the physical machines and the communication permission information, by a second calculator of the system management device; and
determining which physical machine among the physical machines is to operate the first machine, using the network cost calculated for each of the physical machines, by a determining unit of the system management device;

wherein the acquisition unit acquires the communication permission information in which a port number used in communication is designated, from a rule of a firewall applied to the first machine and wherein the second calculator calculates the network cost by summing values obtained by multiplying a weight based on the port number designated in the communication permission information by the network distances between the physical machine which is a target of calculating the network cost, and each of the physical machines in which the second machine permitted to communicate with the first machine is operated.

7. A computer program product comprising a non-transitory computer readable medium containing a program, wherein the program causes a system management device that manages a network system in which a plurality of physical machines, which operate a virtual machine, are connected to be communicable through a network, to execute:

calculating, for each combination of the physical machines, a network distance representing magnitude of load during communication between one of the plurality of physical machines and another physical machine, by a first calculator of the system management device;

acquiring communication permission information representing that a first machine is permitted to communicate with which second machine among a plurality of second machines, the first machine being a virtual machine to be newly operated, and each of the second machines being a virtual machine already operated in any one of the physical machines, by an acquisition unit of the system management device;

calculating, for each of the physical machines, a network cost representing magnitude of load of the network system during communication between the communication-permitted second machine and the first machine when one of the physical machines operates the first machine, on the basis of the network distance calculated for each combination of the physical machines and the communication permission information, by a second calculator of the system management device; and determining which physical machine among the physical machines is to operate the first machine, using the network cost calculated for each of the physical machines, by a determining unit of the system management device;

wherein the acquisition unit acquires the communication permission information in which a port number used in communication is designated, from a rule of a firewall applied to the first machine and wherein the second calculator calculates the network cost by summing values obtained by multiplying a weight based on the port number designated in the communication permission information by the network distances between the physical machine which is a target of calculating the network cost, and each of the physical machines in which the second machine permitted to communicate with the first machine is operated.

* * * * *